United States Patent
Mayernick (10) Patent No.: US 12,245,598 B2
(45) Date of Patent: Mar. 11, 2025

(54) DOUGH DISPENSING AND BAKING SYSTEM

(71) Applicant: Robert Mayernick, South Bend, IN (US)

(72) Inventor: Robert Mayernick, South Bend, IN (US)

(73) Assignee: Robert Mayernick, South Bend, IN (US)

( * ) Notice: Subject to any disclaimer, the term of this patent is extended or adjusted under 35 U.S.C. 154(b) by 0 days.

(21) Appl. No.: 18/750,023

(22) Filed: Jun. 21, 2024

(65) Prior Publication Data
US 2024/0334940 A1    Oct. 10, 2024

Related U.S. Application Data

(62) Division of application No. 18/077,292, filed on Dec. 8, 2022.

(51) Int. Cl.
| | |
|---|---|
| *A21C 11/16* | (2006.01) |
| *A21C 9/08* | (2006.01) |
| *A21D 8/02* | (2006.01) |

(52) U.S. Cl.
CPC ......... *A21C 11/163* (2013.01); *A21C 9/081* (2013.01); *A21D 8/02* (2013.01)

(58) Field of Classification Search
CPC .......... A21C 11/163; A21C 9/081; A21D 8/02
USPC ........................................... 99/507
See application file for complete search history.

(56) References Cited

U.S. PATENT DOCUMENTS

| | | | |
|---|---|---|---|
| 4,251,201 A * | 2/1981 | Krysiak | B30B 11/34 426/94 |
| 6,156,364 A | 12/2000 | Meibach | |
| 11,273,574 B2 | 3/2022 | Kreiger et al. | |

FOREIGN PATENT DOCUMENTS

| | | | |
|---|---|---|---|
| CA | 2584174 | 10/2009 | |
| CH | 488407 A | 4/1970 | |
| DE | 102009050357 A1 | 4/2011 | |
| GB | 2525581 A | 4/2015 | |
| WO | WO-2008081213 A2 * | 7/2008 | ............ A21B 5/08 |

OTHER PUBLICATIONS

Machine Translation of WO2008081213 (Year: 2024).*

* cited by examiner

*Primary Examiner* — Steven W Crabb
*Assistant Examiner* — Thomas J Ward
(74) *Attorney, Agent, or Firm* — Sanders Pianowski LLP (57) ABSTRACT

A system and method for dispensing a first and second baking material where the baking materials are simultaneously dispensed through a discharge tube. The discharge tube is moved with respect to a male mold while dispensing the baking materials. An optional pressure foot follows the discharge tube and assists with joining the dispensed layer with the previous layer by applying pressure. The baking materials are dispensed and layered to form complex shapes not possible by pouring or application of a sheet of dough. The dough and mold are baked together and the baked item is removed from the mold after baking.

14 Claims, 8 Drawing Sheets

DOUGH DISPENSING AND BAKING SYSTEM

CROSS REFERENCE TO RELATED APPLICATIONS

This application is a divisional and claims the benefit of priority from the prior U.S. patent application Ser. No. 18/077,292, filed on Dec. 8, 2022, the entire contents of which are incorporated herein by reference.

BACKGROUND OF THE INVENTION

The present disclosure relates to baked goods, particularly baked bread that can be used for carrying fillings that are later added by the user. Baked bread that is designed for fillings can have a shape that is not easily manufactured using conventional baking methods, such as cup or bowl shapes or multi-cavity designs. Others have attempted to solve this problem using injection molding, custom baking pans, and wrapping, but each suffer from difficulties in repeatable manufacturing or overly-complicated machines. Machines that wrap dough around require the mold or dispensing apparatus to rotate, which adds complexity. Further, these machines do not have the ability to manufacture alternative shapes. Therefore, an improved manufacturing method and system is needed.

SUMMARY OF THE INVENTION

The present disclosure describes a three-axis dispensing system with accompanying pan, which can dispense dough along an outside and/or inside wall of a mold, including complex shapes not possible through conventional dough forming methods. The dispensing system includes a multi-material dispensing tube that is moveable in multiple directions to dispense a flowable dough over a male mold located on a pallet. The male mold is open at the top during dispensing and may be surrounded on the sides. The multi-material dispensing tube can be configured to dispense different types of dough, a dough and a bonding agent, or a dough and a filling. A robot or gantry moves the dispensing tube or pallet to follow the profile of the male mold and dispense material to cover the mold without needing to rotate the dispensing apparatus or the mold. The dispensing tube has a rotating pressure foot that applies pressure to the dispensed material to assist bonding of layers. After dispensing, the dispensing tube is removed from the mold and a mold ram presses down to conform the dispensed dough to the male mold. Dough-facing surfaces of the male mold portion, housing halves, and mold ram completely enclose the dispensed dough to form a unitary shape that conforms to the dough-facing surfaces. The housing halves are withdrawn from the pallet and the unitary shape is baked on the pallet. After baking, the baked shape is removed from the pallet.

DESCRIPTION OF THE PREFERRED EMBODIMENT

Figure 1:
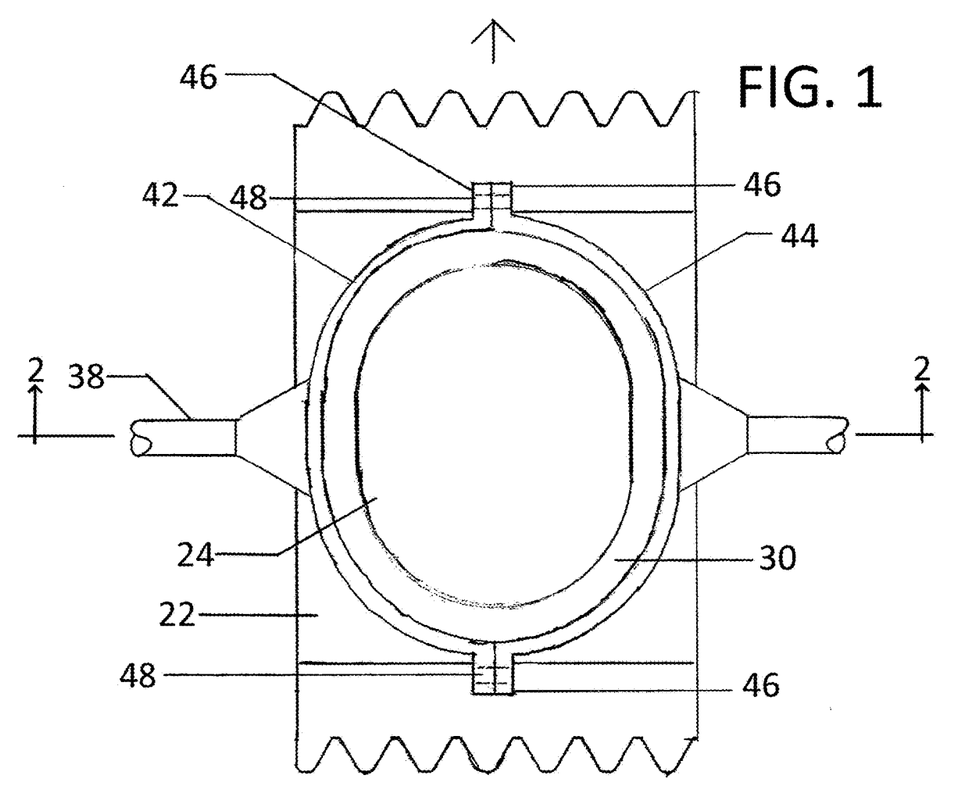
FIG. 1 is a top view of a baked good production system.
Figure 2:
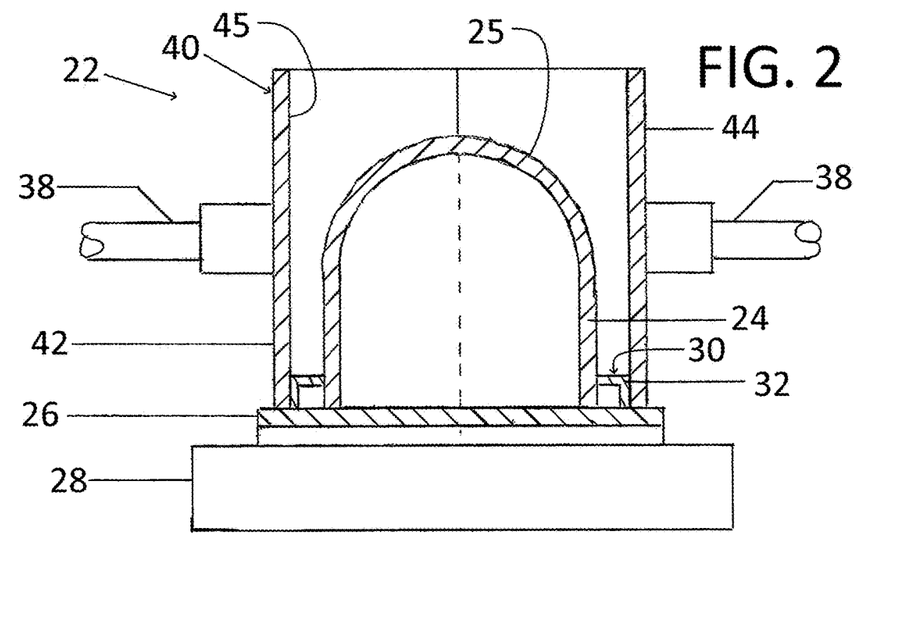
FIG. 2 is a side section view 2-2 of the system in FIG. 1.
Figure 3:
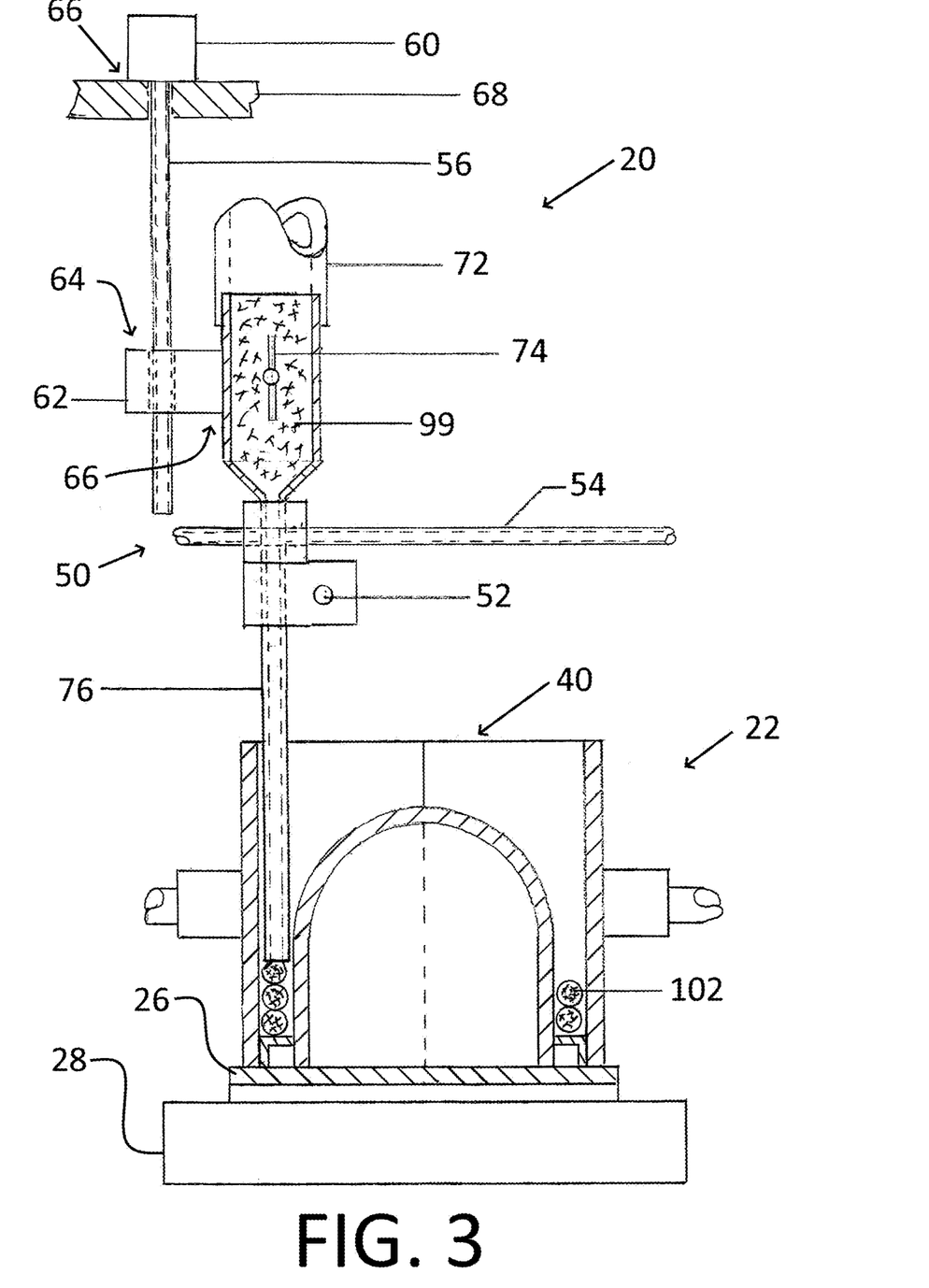
FIG. 3 is a side section view 2-2 of the system in FIG. 2 in use with a 3-axis dispensing system.

A dough dispensing and baking system is shown in FIG. 3, with a dispenser 20 and a pallet 22. The components described herein form part of a production process that would include an oven and cleaning stations, which are not shown. The pallet 22 is shown in FIGS. 1-2 and is filled by the dispenser 20, shown in FIGS. 3-4.

Figure 6:
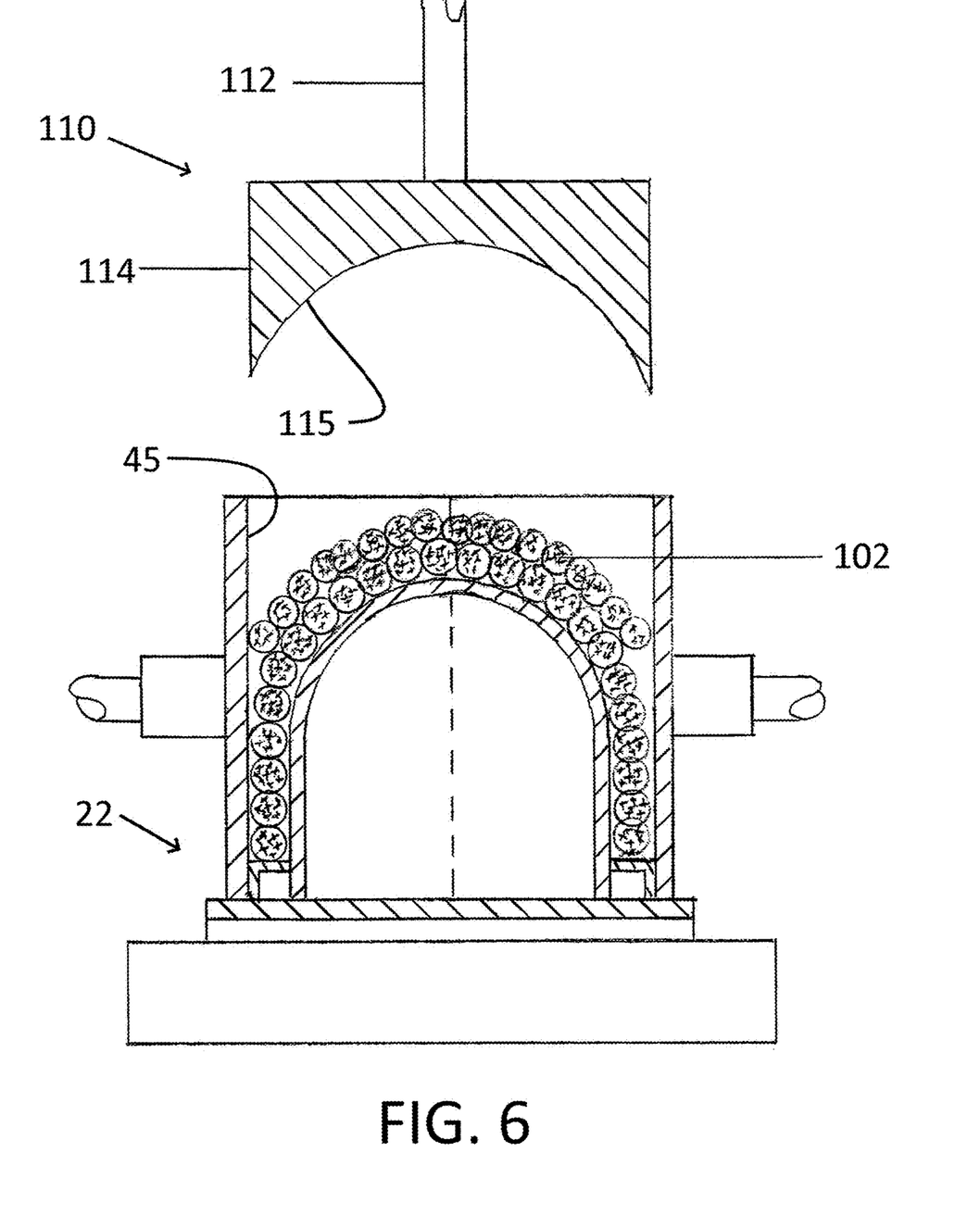
FIG. 6 is a side section of the system in FIG. 3 after dispensing is complete.
Figure 8:
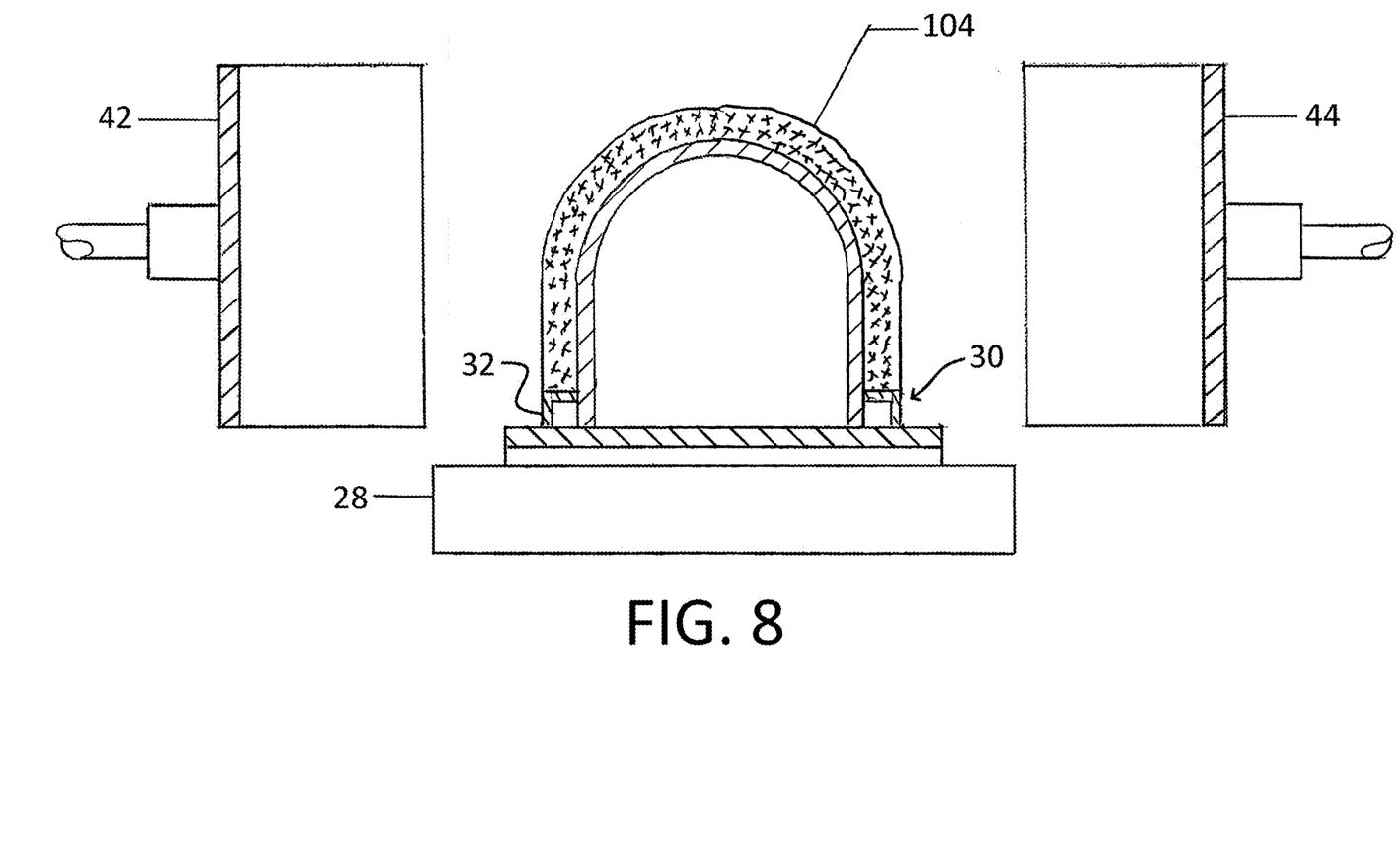
FIG. 8 is a side view of the system in FIG. 7 before baking with the housing halves withdrawn.

The pallet 22 has a male mold portion 24 that is affixed to a base plate 26. The male mold portion 24 is shown as a domed shape formed from sheet metal but other shapes or materials are contemplated, provided the materials can survive a baking process. The male mold portion 24 has a dough-facing surface 25 that may be coated with a non-stick material to aid the removal of a baked good. The pallet 22 can be used with a conveyor 28 for moving the pallet between stations, the oven, and other parts of the manufacturing process (not shown). A centering ring 30, either integrated with or affixed to the male mold portion 24 or as a separate piece, is located on the male mold portion 24 where it meets the base plate 26. If used as a separate piece, the centering ring 30 can be used to strip baked goods off of the male mold portion 24. The centering ring 30 has a perimeter surface 32 that is spaced from the outer surface of the male mold portion 24. The perimeter surface 32 serves as a stop and locating feature for an outer housing 40. As shown, the outer housing 40 is formed from two housing halves 42, 44 that meet to partially enclose the male mold portion 24. As can be seen in FIG. 1, the housing halves 42, 44 have alignment flanges 46, pins 48, and/or other features to align one housing half 42 with the other housing half 44. The housing halves 42, 44 are moved between a clamped position as shown in FIG. 6 and an unclamped position as shown in FIG. 8 with actuators 38. In the clamped position, the housing halves 42, 44 are in contact with the perimeter surface 32. The outer housing 40 has an inside dough-facing surface 45 that may be coated with a non-stick material to aid in the release of unbaked dough when the housing halves 42, 44 are withdrawn.

The system includes a multi-axis actuator 50 that is capable of movement in three different axes, with an x axis actuator 52 connected to a y axis actuator 54, which is then connected to a z axis actuator 56. The actuators 52, 54, 56 are independently controllable to follow predetermined paths based on the size and shape of the male mold portion 24 and/or desired baked good. As shown, each actuator includes a servo motor 60 and moving components such as a ball screw 62 and nut 64, along with mounting components 66. The mounting components allow the multi-axis actuator 50 to be mounted to other components, actuators, or a frame 68. As shown in FIG. 3, the multi-axis actuator 50 is part of the dispenser 20. It is contemplated that instead of a plurality of discrete actuators, the multi-axis actuator 50 is a cartesian, SCARA, 6-axis, or other type of robot. The dispenser 20 includes a supply of flowable material that comes from a mixer, hopper, or other source through a flexible dough tube 72. The material 99 may be liquid enough to flow from gravity or may be viscous enough to need pumping or pressure to dispense. A valve 74 can start or stop the flow of material 99 to the discharge tube 76. The discharge tube 76 is sized so that it can fit between the outer housing 40 and male mold portion 24. The pallet 22 shown in FIGS. 1-3 and 5 represents a non-limiting example.

It is contemplated that the pallet 22 is picked up or otherwise moved with respect to the discharge tube 76 by the multi-axis actuator 50. In this case, the discharge tube 76 would remain stationary and the pallet 22 would be positioned. In either configuration, the outer housing 40 may not be present during dispensing, which may allow for a larger discharge tube.

Figure 4:
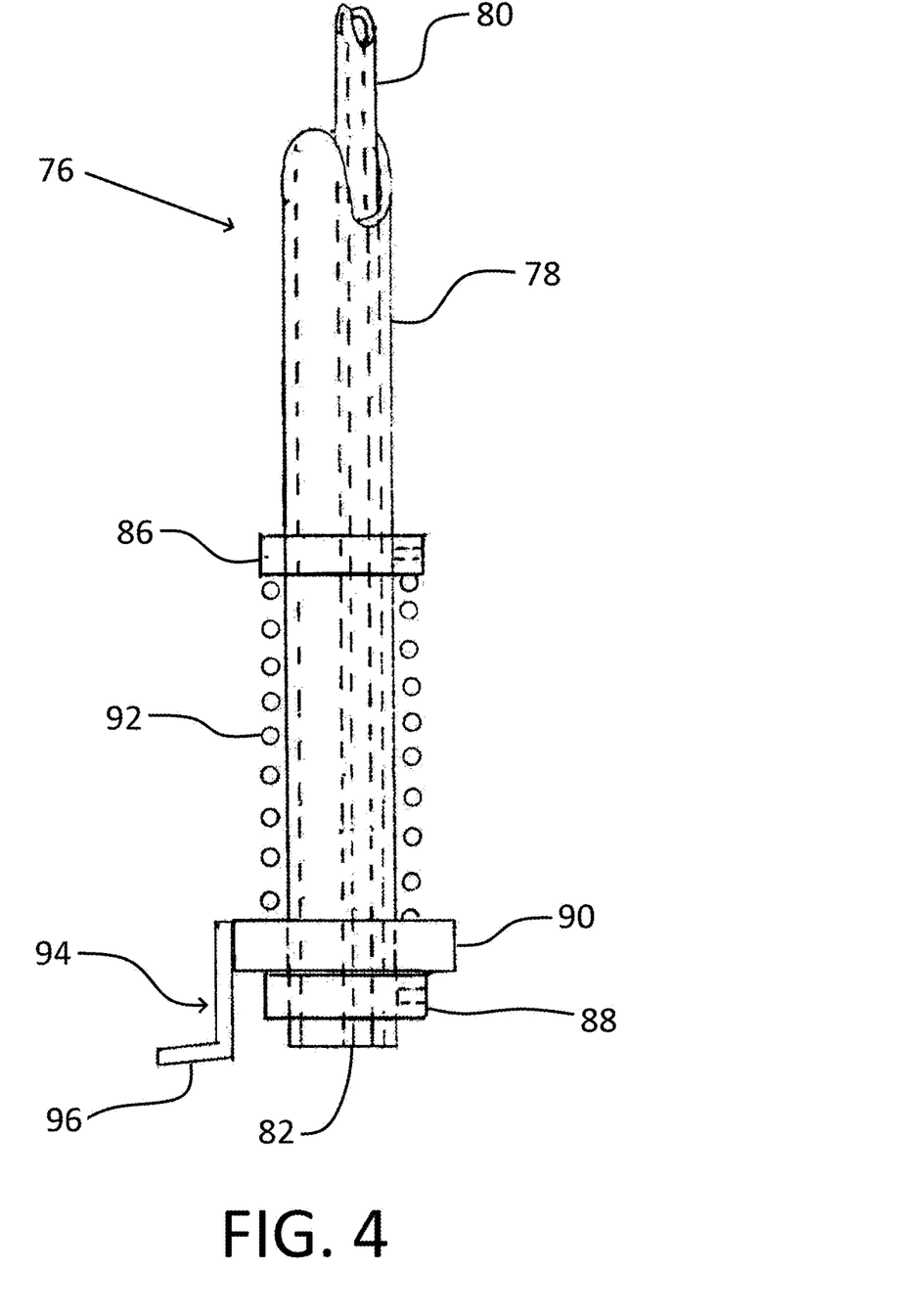
FIG. 4 is a detail side view of the discharge tube in FIG. 3.
Figure 5:
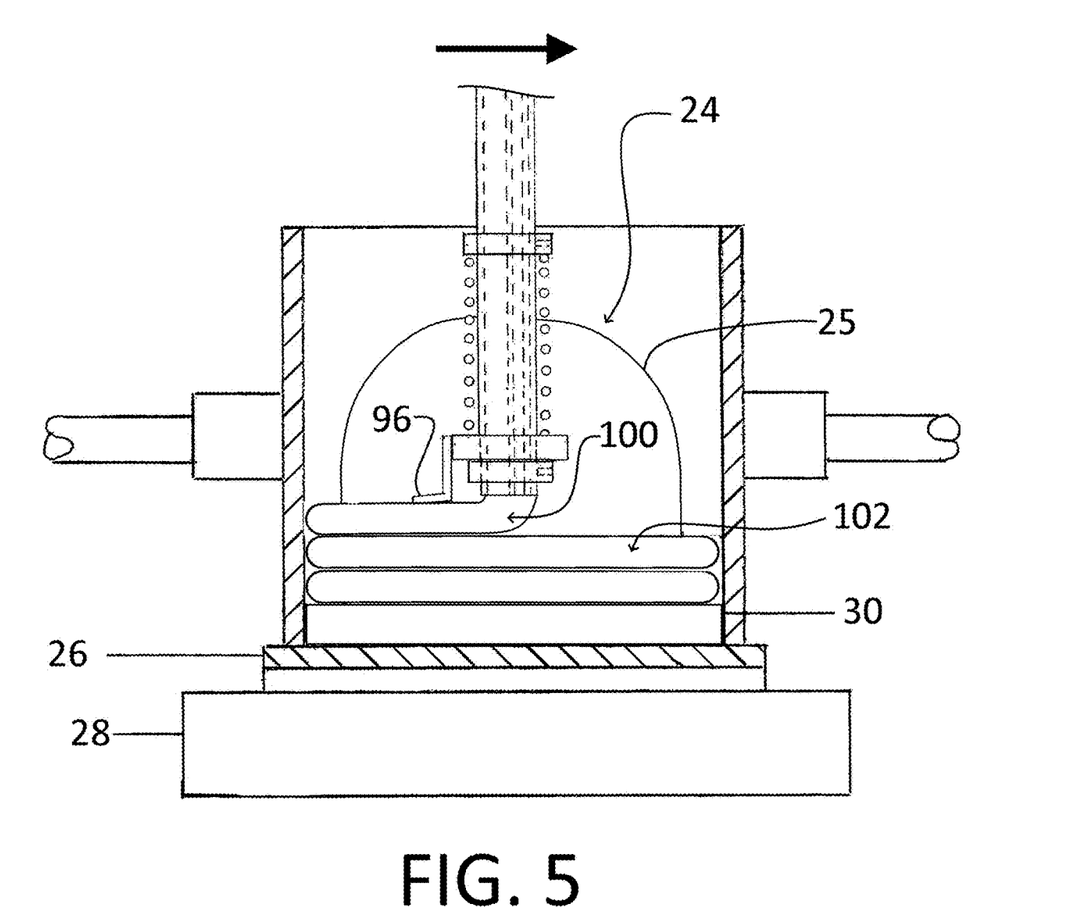
FIG. 5 is a side view of the system showing dispensing.

The discharge tube 76 is shown in FIG. 3 in simplified form, with FIG. 4 showing additional detail. The discharge tube 76 has a primary or main flow tube 78 and a secondary or auxiliary flow tube 80. The discharge tube 76 is drawn in FIG. 4 as discrete tubes with the primary tube 78 encircling the secondary flow tube 80, but it is contemplated that the discharge tube is a double or multi-lumen tube where more than one fluid path is separately carried by a single tube or tubing assembly. The flow tubes 78, 80 would have their own corresponding supply of flowable material and each have their own valve. The main flow tube 78 can dispense a first material 99 and the secondary flow tube 80 can dispense a second material 101. The materials 99, 101 can be dough, a bonding agent, corn starch, fillings, or different doughs to form a pattern in the baked good. The outside of the main flow tube 78 has an upper locking collar 86 and a lower locking collar 88 that are used to constrain a rotating pressure collar 90. The rotating pressure collar 90 is biased towards a terminal end 82 through a spring 92. The rotating pressure collar 90 can rotate with respect to the discharge tube 76, which allows a pressure slide 94 and foot 96 to rotate. This allows the foot 96 to apply pressure to the dispensed dough as shown in FIG. 5. As the discharge tube 76 is moved around the male mold portion 24 it does not rotate, but the pressure slide 94 follows the dispensed dough 100 because the pressure collar 90 allows rotation. It is contemplated that dispensing of the dispensed dough 100 occurs without the outer housing 40. In either event, the dispensed dough 100 is thin enough to be pumped through the discharge tube 76 but thick enough to be layered as shown in FIG. 5. As dispensed onto a mold such as shown in FIG. 5, the viscous dough 100 is thick enough to remain substantially in the same position and shape as when it was dispensed. Thick enough (or viscous dough) is defined as not flowing to or pooling in the lowest area of the mold before the dough is baked. As dispensed, the viscous dough does not have to remain in exactly the same shape and position, only that it does not pool or flow before baking.

While the male mold portion 24 is drawn as a relatively simple domed shape in the FIGS., the male mold portion 24 can be complex. Because the dispenser 20 can move with respect to the pallet 22 in multiple directions, baked goods could include multiple pockets, multiple buns, or shapes otherwise not possible through conventional dough and pan arrangements.

Figure 9:
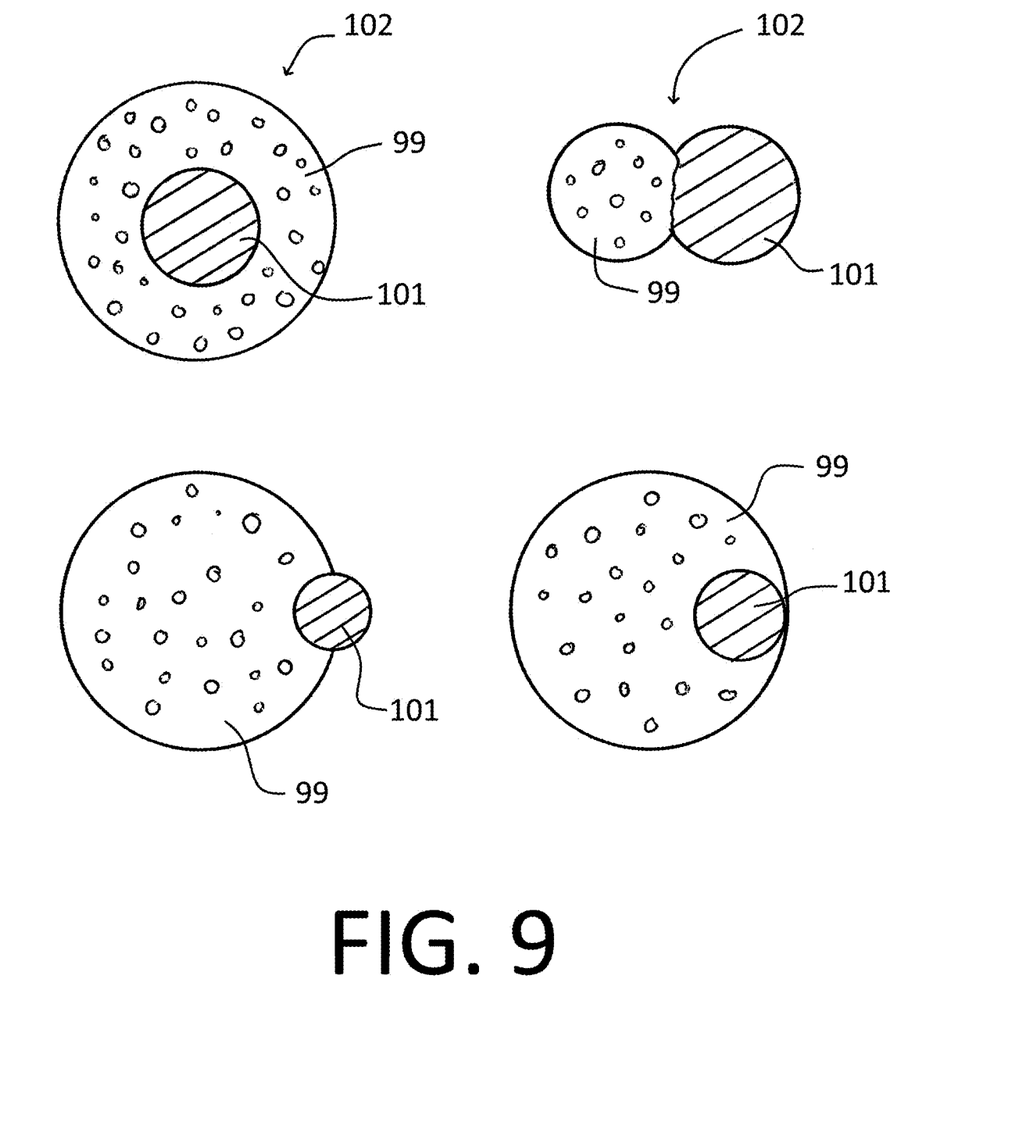
FIG. 9 shows alternative sections of dispensed material.

As the dough 100 is dispensed around the male mold portion 24, it forms layers of a dough noodle 102, shown in FIG. 5. Depending on the configuration of the discharge tube 76, the dough noodle 102 may have different section views, with some non-limiting examples shown in FIG. 9. For example, the first material 99 could completely encapsulate the second material 101, the materials 99, 101 could be partially embedded with both exposed, or the materials 99, 101 could be adjacent. The discharge tube 76 allows manufacturing flexibility, such as the inclusion of a fruit or cheese filling as part of the baking process, different dough colors or types, or other combinations of edible materials.

Figure 7:
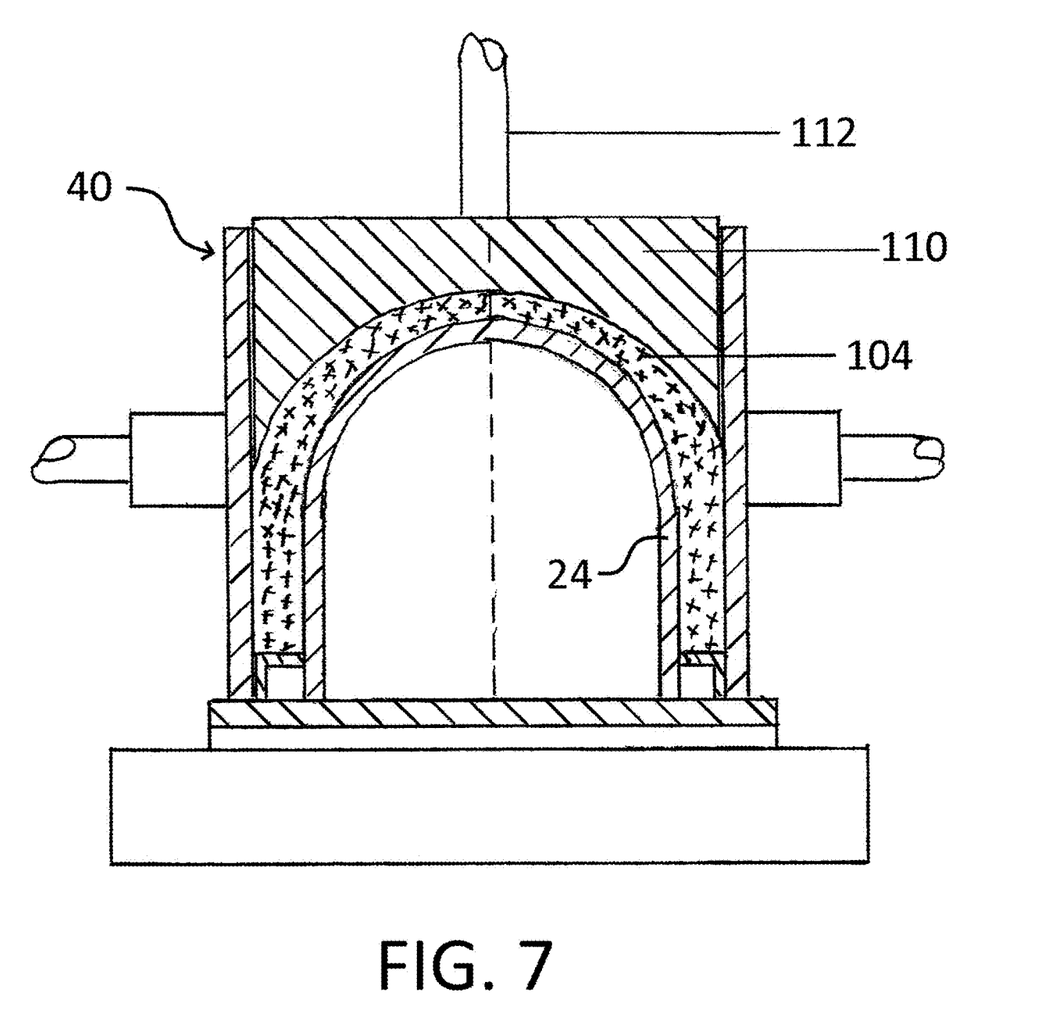
FIG. 7 is a side section of the system in FIG. 6 after the dough noodle is compressed

After the dough is completely dispensed and the male mold portion 24 may be covered with dispensed dough noodle 102, the pallet 22 may look as shown in section view FIG. 6, with gaps between layers of the dough noodle 102. It is contemplated that the dispensed dough noodle 102 intentionally leaves portions of the male mold exposed. If the dough noodle 102 was baked as shown in FIG. 6, the final product would be dimensionally unstable and may contain voids. The dough noodle 102 may need to be compressed into a unitary dough shape 104 as is shown in FIG. 7. To accomplish this, the system may include a mold ram 110, moved towards the male mold portion 24 by a mold ram rod 112. If the housing halves 42, 44 were not present for the dough 100 dispensing, they would now be brought into position as shown in FIG. 6 before the mold ram 110 compresses the dough noodle 102. The mold ram 110 has a perimeter surface 114 to fit in the outer housing and a dough-facing surface 115 that is complementary to part of the dough-facing surface 25 on the male mold 24. The dough-facing surface allows for a consistent or predictable wall thickness as shown in FIG. 7. The dough-facing surface 115 may have a non-stick coating to allow the dough to release when the mold ram 110 is withdrawn. During the compressing operation, the outer housing 40 remains to form an enclosed area. The dough noodle 102 is trapped between the male mold 24, housing halves 42, 44, mold ram 110, and centering ring 30. Gaps between these components allow trapped air to escape as the mold ram 110 reaches the position shown in FIG. 7, which forms the unitary dough shape 104.

Next, the housing 40 is removed when the housing halves 42, 44 are retracted. The unitary dough shape 104 and pallet 22 enter a baking oven (not shown). After the unitary dough shape 104 is baked, the baked item is removed from the pallet 22, where the baked item is then cooled and later packaged for shipment and the pallet 22 is cleaned and returned to the start of the process.

An alternate dispensing system is contemplated for baked goods and molds that can be used with dough that is pourable or flowable. Pourable or flowable dough is defined as a dough mixture that would not retain its shape if dispensed on a bowl-shaped or domed male mold and is primarily suitable for horizontal molds. Instead of dispensing a dough noodle 102 with the 3-axis dispenser (shown in FIG. 3), the dispenser could be 2-axis. Dispensed flowable dough does not require a pressure foot 96 or mold ram 110 to bond the freshly dispensed dough to any previously-dispensed dough, so the dispenser only moves horizontally (x and y axes) with respect to the mold. The dispensed flowable dough bonds to any previously dispensed flowable dough in the mold.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A method of producing an edible container comprising:
providing a baking pallet having a base plate and a mold, said mold having a baking surface;
providing a dispenser having a primary flow tube and a secondary flow tube, said primary flow tube for carrying a first baking material, said secondary flow tube for carrying a second baking material, said first baking material being different from said second baking material;

providing an outer housing for partially enclosing said mold and leaving an open top;

providing an actuator for moving said dispenser with respect to said mold;

continuously dispensing said first and said second baking materials in overlapping layers while simultaneously moving said dispenser with said actuator with respect to said baking pallet to cover said baking surface with said overlapping layers; and baking said mold and said overlapping layers to form said edible container.

2. The method of claim 1, further providing a mold ram having a dough-facing surface complementary to a portion of said mold and a perimeter surface complementary to said dough-facing surface of said outer housing, further comprising contacting said overlapping lavers with said mold ram to compress and join said overlapping layers into a unitary form.

3. The method of claim 1, further providing a pressure slide connected to and adjacent a terminal end of said dispenser, said pressure slide having a foot affixed thereto and rotatable with respect to said dispenser, said pressure slide and said foot are clear of said terminal end of said dispenser, said foot extending beyond and adjacent said terminal end of said dispenser, further comprising continuously joining and compressing said overlapping layers against said base plate.

4. The method of claim 1, further providing a centering ring having a perimeter surface.

5. The method of claim 4, further comprising removing said edible container from said mold by moving said centering ring away from said base plate.

6. A method of producing an edible container comprising:

providing a baking pallet having a base plate and a mold, said mold having a baking surface;

providing a dispenser having a primary flow tube and a secondary flow tube, said primary flow tube for carrying a first baking material, said secondary flow tube for carrying a second baking material, said first baking material being different from said second baking material;

providing an outer housing for partially enclosing said mold and leaving an open top;

providing an actuator for moving said dispenser with respect to said mold;

continuously dispensing said first and said second baking materials in overlapping layers while simultaneously moving said dispenser with said actuator with respect to said baking pallet to cover said baking surface with said overlapping layers;

providing a pressure slide connected to and located adjacent a terminal end of said dispenser, said pressure slide having a foot affixed thereto and rotatable with respect to said dispenser, said foot extending beyond and adjacent said terminal end of said dispenser, further comprising continuously joining and compressing said overlapping layers against said base plate; and baking said mold and said compressed overlapping layers to form said edible container.

7. The method of claim 6, further providing a mold ram having a dough-facing surface complementary to a portion of said mold and a perimeter surface complementary to said dough-facing surface of said outer housing, further comprising contacting said overlapping lavers with said mold ram to compress and join said overlapping layers into a unitary form.

8. The method of claim 6, further providing a centering ring having a perimeter surface.

9. The method of claim 8, further comprising removing said edible container from said mold by moving said centering ring away from said base plate.

10. The method of claim 6, wherein said second baking material includes a bonding agent.

11. A method of producing an edible container comprising:

providing a baking pallet having a base plate and a mold, said mold having a baking surface;

providing a dispenser having a primary flow tube and a secondary flow tube, said primary flow tube for carrying a first baking material, said secondary flow tube for carrying a second baking material, said first baking material being different from said second baking material;

providing an outer housing for partially enclosing said mold and leaving an open top;

providing an actuator for moving said dispenser with respect to said mold;

continuously dispensing said first and said second baking materials in overlapping layers while simultaneously moving said dispenser with said actuator with respect to said baking pallet to cover said baking surface with said overlapping layers;

providing a mold ram having a dough-facing surface complementary to a portion of said mold and a perimeter surface complementary to said dough-facing surface of said outer housing, further comprising contacting said overlapping layers with said mold ram to compress and join said overlapping layers into a unitary form; and baking said mold and said compressed overlapping layers to form said edible container.

12. The method of claim 11, further providing a pressure slide connected to and adjacent a terminal end of said dispenser, said pressure slide having a foot affixed thereto and rotatable with respect to said dispenser, said pressure slide and said foot are clear of said terminal end of said dispenser, said foot extending beyond and adjacent said terminal end of said dispenser, further comprising continuously joining and compressing said overlapping layers against said base plate.

13. The method of claim 11, further providing a centering ring having a perimeter surface.

14. The method of claim 13, further comprising removing said edible container from said mold by moving said centering ring away from said base plate.

* * * * *